US006691695B2

(12) United States Patent
Buechel

(10) Patent No.: US 6,691,695 B2
(45) Date of Patent: Feb. 17, 2004

(54) METHOD AND APPARATUS FOR MAKING A STONE VENEER PRODUCT

(76) Inventor: Dennis F. Buechel, 170 W. Pioneer Rd., #206, Fond du Lac, WI (US) 54935

( * ) Notice: Subject to any disclaimer, the term of this patent is extended or adjusted under 35 U.S.C. 154(b) by 15 days.

(21) Appl. No.: 10/096,731

(22) Filed: Mar. 13, 2002

(65) Prior Publication Data

US 2003/0172916 A1 Sep. 18, 2003

(51) Int. Cl.[7] .................................................. B28D 1/04
(52) U.S. Cl. ..................................................... 125/13.01
(58) Field of Search ........................... 125/13.01, 15, 125/12; 451/411, 412, 57, 41, 365

(56) References Cited

U.S. PATENT DOCUMENTS

| | | | | |
|---|---|---|---|---|
| 390,034 A | * | 9/1888 | Peckover | 125/13.01 |
| 2,695,015 A | * | 11/1954 | Cooper | 125/13.01 |
| 2,909,169 A | * | 10/1959 | Vonada | 451/365 |
| 5,720,648 A | * | 2/1998 | Green et al. | 451/8 |

* cited by examiner

Primary Examiner—Robert A. Rose
(74) Attorney, Agent, or Firm—Andrus, Sceales, Starke & Sawall, LLP

(57) ABSTRACT

The present invention provides a method and apparatus for cutting a stone workpiece to make a pair of stone veneer products which are capable of being handled without breaking, and which are advantageously used as a decorative product on all types of outside and inside wall surfaces in the construction industry.

9 Claims, 3 Drawing Sheets

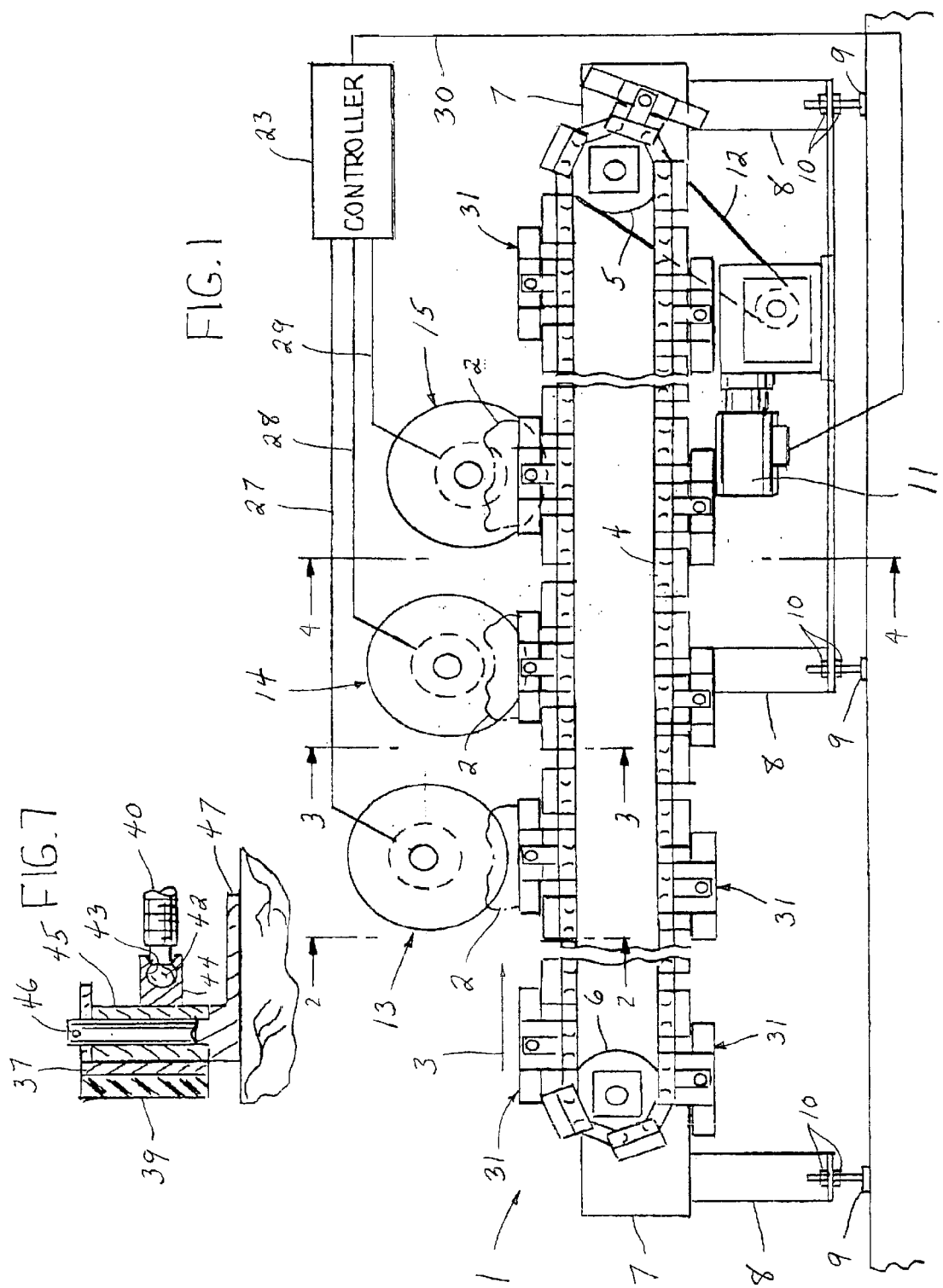

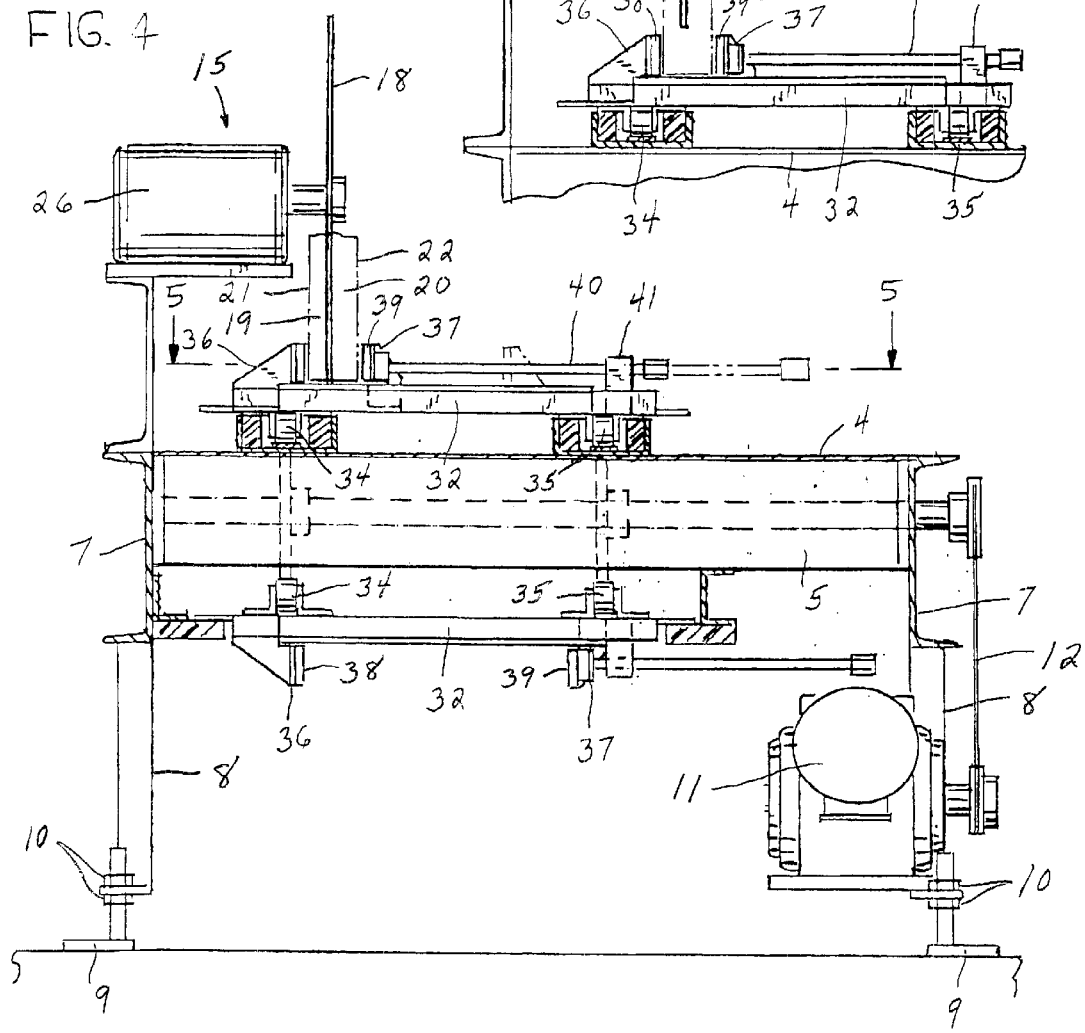

METHOD AND APPARATUS FOR MAKING A STONE VENEER PRODUCT

BACKGROUND OF THE INVENTION

The present invention relates to natural stone veneer products, and more particularly to a method and apparatus for making the same.

Stone veneer products made from naturally occurring stone materials such as limestone, marble, granite and the like, have long been used in the construction industry for decorative purposes because of their inherent beauty. However, natural stone veneer products are difficult to make and are expensive due to high production losses as a result of breakage and high handling costs.

Because stone veneer products are typically applied to inside and/or outside wall surfaces, the weight of the stone product is a major concern. Typically, individual limestone veneer products weigh about 15 pounds per square foot. Therefore, it would be desirable to provide a lighter stone veneer product which is of a weight that can be easily handled without breaking. Also, it is desirable to provide as little thickness of stone material as possible so as to reduce costs and extend the supply of natural stone material.

SUMMARY OF THE INVENTION

It is therefore an object of the present invention to provide an improved method and apparatus for manufacturing stone veneer products.

It is a further object of the present invention to provide such a method and apparatus which permits manufacturing stone veneer products that are relatively thin so that the weight of each veneer product can be reduced.

It is yet another object of the present invention to provide such a method and apparatus which is faster, more efficient, less expensive, higher in yield and less wasteful than prior production methods.

In order to accomplish the above objects, the present invention provides a method of cutting a natural stone to make a stone veneer product. The method includes the steps of conveying a stone to be cut at a desired speed along a cutting path, and cutting through the stone to form a pair of stone veneer products. The step of cutting through the stone comprises making a plurality of sequential cuts in the stone with each subsequent cut being deeper than the previous cut as the stone moves downstream along the cutting path until the stone is cut completely through to form the pair of stone veneer products. Preferably, the stone is cut completely through in three steps, i.e. cutting to a first depth which is approximately one-third through the stone, thereafter cutting to a second depth which is approximately two-thirds through the stone, and finally cutting to a third depth which is completely through the stone. In one particularly preferred embodiment, the method includes the additional step of controlling the desired speed of the stone as it moves downstream along the cutting path as a function of resistance of the stone to cutting. Controlling the speed of the stone is accomplished by sensing the resistance of the stone to cutting, comparing the sensed resistance to a predetermined resistance value, and reducing the speed of the stone along the cutting path if the resistance to cutting exceeds the predetermined value.

It is also desirable to provide an apparatus for cutting the stone to make a pair of stone veneer products. The apparatus includes a conveyor for conveying a stone to be cut at a desired speed along a cutting path, a clamp for clamping the stone in a desired position on the conveyor, and a plurality of aligned saws for cutting through the stone to form a pair of stone veneer products. The saws are positioned to make a plurality of sequential cuts in the stone with each subsequent cut being deeper than the previous cut as the stone moves downstream until the stone is cut completely through. Preferably, a first saw cuts approximately one-third through the stone, a second saw cuts approximately two-thirds through the stone and a third saw cuts completely through the stone.

The apparatus preferable further includes control means for controlling the desired speed of the stone as a function of resistance of the stone to being cut. The control means includes sensing means for sensing the resistance of the stone to being cut, comparator means for comparing the sensed resistance to a predetermined resistance value, and speed reduction means for reducing the speed of the stone along the cutting path if the resistance to cutting exceeds the predetermined value. Preferably, each saw is driven by an electric motor and the sensing means senses amperage of at least one of the electric motors. If the amperage sensed exceeds a predetermined value, the control means slows the conveyor so that the saws more efficiency cut through the stone.

In a particularly preferred embodiment, the apparatus includes a trolley on the conveyor for receiving an individual stone workpiece, and a clamp which includes a pair of jaws integral with the trolley. One of the jaws is preferably stationary and thus functions as a reference datum for properly locating the stone to be cut with respect to the saws. The other jaw is preferably moved in a direction which is transverse to the cutting path to hold the natural stone workpiece in the proper position. The means for moving this jaw preferably comprises a screw member and a ball joint interconnecting the screw member and the jaw. Each jaw also preferably includes a clamping face, such as a rubber lining, which is adapted to substantially conform to the textured surface of the stone workpiece. In this manner, the stone workpiece can be securely clamped in the proper position for being cut by the saws.

BRIEF DESCRIPTION OF THE DRAWINGS

The drawings illustrate the best mode presently contemplated of carrying out the invention:

In the drawings:

FIG. 1 is a side view in elevation of an apparatus for cutting a stone workpiece to make a pair of stone veneer products constructed in accordance with the principles of the present invention;

FIG. 3 is an end view similar to FIG. 2 taken along the plan of the line 3—3 in FIG. 1 showing a saw approximately two-thirds through the stone workpiece;

FIG. 4 is an end view similar to FIGS. 2 and 3 taken along the plan of the line 4—4 in FIG. 1 illustrating a saw cutting completely through the stone workpiece to form the veneer products;

FIG. 7 is a cross-sectional view of the movable clamping jaw used to hold a workpiece and taken along the plan of the line 7—7 in FIG. 5.

DESCRIPTION OF THE PREFERRED EMBODIMENT

Figure 5:
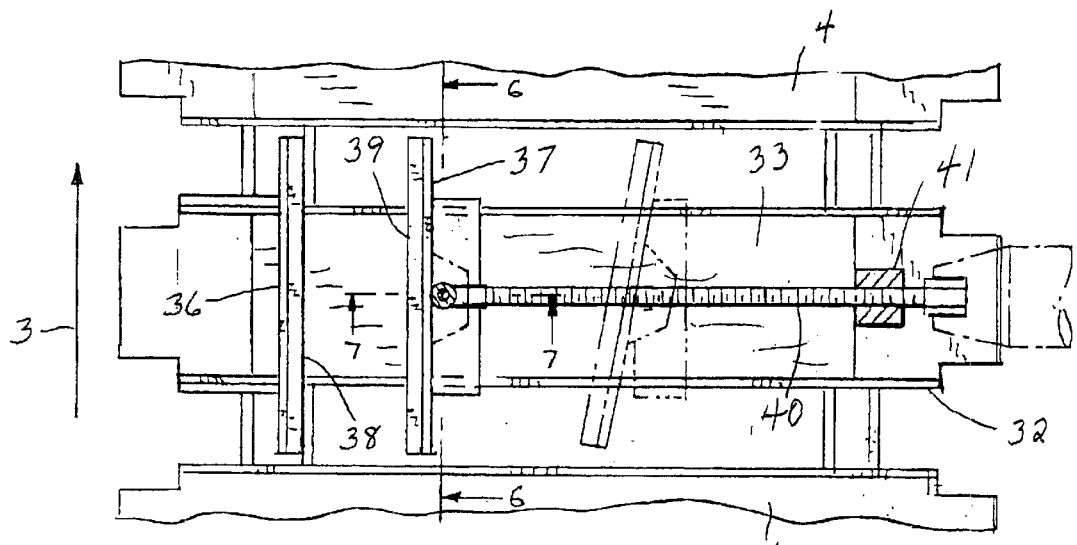
FIG. 5 is a top plan view of a trolley for holding the stone workpiece taken along the plan of the line 5—5 in FIG. 4.

Referring now to the drawings, the present invention provides a method and apparatus for cutting a stone workpiece to make a pair of stone veneer products which are capable of being handled without breaking, and which are advantageously used as a decorative product on all types of outside and inside wall surfaces in the construction industry. The stone workpiece which is to be cut typically comprises a relatively thin slab, i.e. about 5–8 inches in width, of a naturally occurring stone material. The naturally occurring stone material that may be used is generally chosen for its architectural decorative purposes, and such material may include limestone, marble, granite, slate, onyx, tyndalstone, sandstone, bluestone, syenite, gneiss, soapstone, basalt and quartz. Although other types of naturally occurring materials other than those listed above could be used to produce the stone veneer products of the present invention, the above list includes the most typical stone materials utilized for decorative purposes in the construction industry. However, the stone workpiece to be cut by the present method and apparatus may be composed of other natural stone material other than that listed above, if desired.

Referring now to FIG. 1, there is illustrated a stone cutting apparatus constructed in accordance with the present invention. The stone cutting apparatus includes a conveyor generally designated by the numeral 1 for conveying a stone 2 to be cut at a desired speed along a cutting path indicated generally by arrow 3. Conveyor 1 includes an endless belt 4 trained about a drive roller 5 and an idle roller 6. Rollers 5 and 6 are supported on a frame 7 and a plurality of legs 8. The height of frame 7 and belt 4 may be adjusted by a plurality of feet 9, which may also be used to level belt 4, by adjusting nuts 10. An electric motor 11 drives roller 5 via belt 12 at a desired speed to move stone 2 along the cutting path 3. Typically, belt 4 will be driven at a speed of from about five feet per minute to about ten feet per minute, preferably about eight feet per minute.

Figure 2:
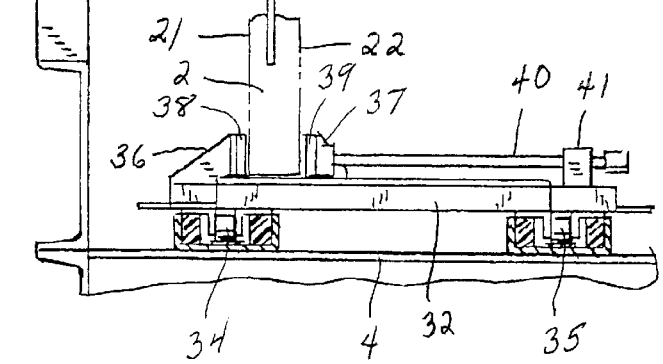
FIG. 2 is an end view taken along the plan of the line 2—2 in FIG. 1 showing a saw approximately one-third through the stone workpiece.

As stone 2 moves downstream along cutting path 3, a plurality of aligned saws 13, 14 and 15 are used to cut through stone 2 to form a pair of stone veneer products each having at least one substantially flat face thereon. Saws 13, 14 and 15 make sequential cuts in stone 2 with each subsequent cut being deeper than the previous cut as stone 2 moves downstream along cutting path 3 until the stone is completely cut. FIG. 2 schematically illustrates blade 16 of saw 13 cutting into stone 2 to a first depth which is approximately one-third through the height of stone 2. FIG. 3 schematically illustrates blade 17 of saw 14 cutting into stone 2 to a second depth which is approximately two-thirds through the height of stone 2. Finally, FIG. 4 schematically illustrates blade 18 of saw 15 cutting to a third depth which is completely through stone 2. As a result, a pair of stone veneer products 19 and 20 are formed each having at least one substantially flat rear face formed by blades 16–18 for attachment to a wall surface, and a textured outer face 21 and 22 respectively which comprises the decorative surface of the veneer products 19 and 20.

Referring again to FIG. 1, there is schematically illustrated a controller 23 which comprises a means for controlling the desired speed of stone 2 along cutting path 3 as a function of resistance of the stone to being cut. Controller 23 thus functions to prevent electric motors 24, 25 and 26 which drive blades 16, 17 and 18 respectively from overloading and burning up. As noted above, this is accomplished by sensing the resistance of stone 2 to being cut, and this is done by sensing the amperage being used by each motor 24, 25 and 26, comparing the sensed amperage to a predetermined value, and reducing the speed of stone 2 along cutting path 3 if the amperage value sensed exceeds the predetermined value. Thus, as illustrated in FIG. 1, the sensors such as lines 27, 28 and 29 are connected at one end to the power leads of motors 24, 25 and 26 respectively and at their other ends to controller 23. Controller 23 in turn provides a signal via line 30 to electric motor 11 to control the speed thereof and thus the speed of belt 4 and stone 2. Each line 27, 28 or 29 may be connected within controller 23 to a conventional voltage divider which has an output that is sent to a conventional voltage comparator where the output is compared to a reference voltage. As long as the output voltage from the divider is less than the reference voltage, no signal is sent to motor 11. If the output voltage from the divider becomes greater than the reference voltage, indicating high resistance by stone 2 to cutting, the comparator generates a signal proportional to the difference between the reference voltage and the output voltage to proportionately reduce the speed of motor 11 and thus belt 4. Controller 23 may be an integrated circuit available from Crompton as part number 814-943-U-PKLS. Thus, if the amperage of one or more electric motors 25–26 exceeds a predetermined value, controller 23 will send a signal to motor 11 to reduce the speed of belt 4 and thus the speed of stone 2 along cutting path 3. When the amperage drops to acceptable levels, controller 23 turns off its signal to motor 11 thus enabling belt 4 to return to its original desired speed.

A plurality of spaced trolleys 31 are attached to belt 4 of conveyor 1 each of which receives a stone 2 to be cut. As shown best in FIGS. 5 and 6, each trolley 31 includes a channel-shaped base 32 which mounts a wooden floor 33 therein. Base 32 is mounted on belt 4 by a pair of bearings 34 and 35 which enable trolley 31 to pass around drive roller 5 and idle roller 6.

A clamp integral with each trolley 31 is used to hold stone 2 in a position wherein the textured surfaces 21, 22 thereof extend substantially parallel to the flat face to be cut therein, and wherein surfaces 21, 22 are substantially parallel to cutting path 3. Each clamp includes a pair of jaws 36 and 37 for holding stone 2 therebetween. Jaw 36 projects upwardly from base 32 and is fixed in a stationary position thereon to function as a reference datum for properly locating stone 2 with respect to saws 13, 14 and 15. Jaw 37, on the other hand is movable in a direction which is transverse to cutting path 3, as shown best in FIGS. 4 and 5. Each jaw 36 and 37 also includes a clamping face adapted to substantially conform to the textured surfaces 21, 22 when clamped against stone 2. Clamping faces 38 and 39 may be composed of any of a number of relatively soft materials, but is preferably a rubber lining.

Figure 6:
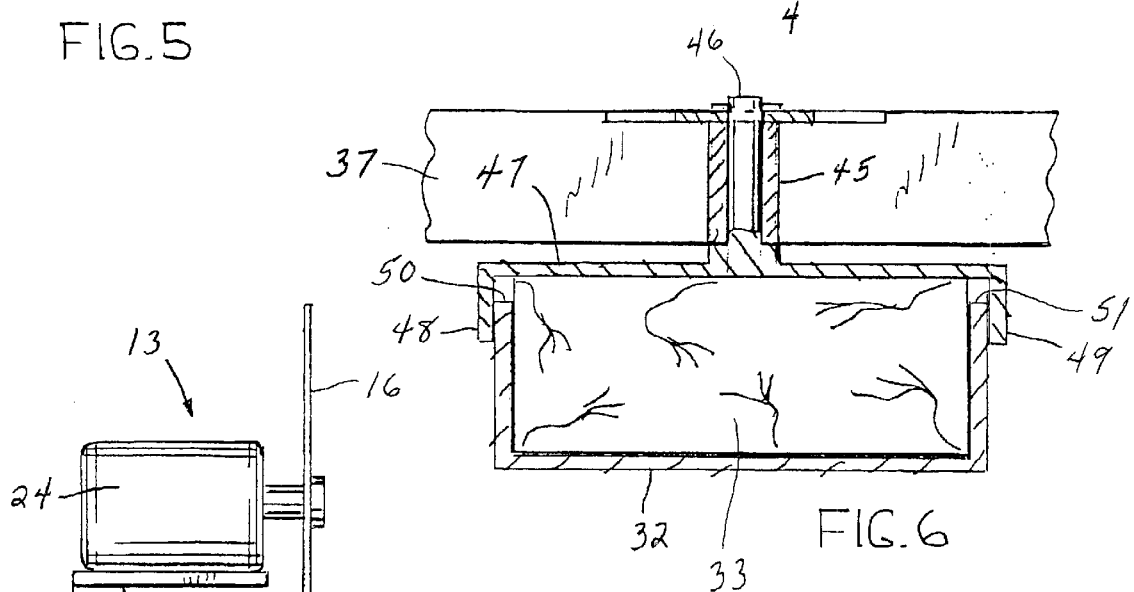
FIG. 6 is a cross-sectional view of the trolley taken along the plan of the line 6—6 in FIG. 5.

The means for moving jaw 37 comprises a screw member 40 which is rotatably supported at one end by an upright stanchion 41. The opposite end of screw member 40 is connected to jaw 37 by a universal joint type mechanism. The universal joint connection between screw member 40 and jaw 37 is best illustrated in FIGS. 6 and 7 and includes a ball joint formed by a ball 42 formed on the end of screw member 40 and a socket 43 formed in a block 44 projecting from a sleeve member 45 which in turn is attached to jaw 37. As shown best in FIG. 5, sleeve member 45 surrounds a pin 46 which extends in an upright manner to permit jaw 37 to pivot thereon on an axis of rotation which is transverse to both the cutting path 3 and the direction of movement of jaw 37. Sleeve 45, pin 46 and jaw 37 are all guided in their movement transversely to cutting path 3 by means of a channel-shaped guide member 47 which has downwardly projecting edges 48 and 49 which overlap the upper edges 50 and 51 of the channel-shaped base 32 of trolley 31. Thus, clamping jaw 37 always moves in a direction which is transverse to cutting path 3, but jaw 37 itself is pivotable to enable it to conform to the textured surface 22 of stone 2. This enables jaws 36 and 37 to securely clamp stone 2 therebetween and to properly orientate it with respect to blades 16–18.

I claim:

1. Apparatus for cutting a stone to make a stone veneer product, comprising:

a conveyor for conveying a stone to be cut at a desired speed along a cutting path;

a clamp for clamping said stone in a desired position on said conveyor;

a plurality of aligned saws for cutting through said stone to form a pair of stone veneer products, said saws positioned to make a plurality of sequential cuts in said stone with each subsequent cut being deeper than the previous cut as said stone moves downstream along said cutting path;

a controller for controlling the desired speed of the stone as a function of resistance of the stone to being cut;

a trolley on said conveyor for receiving said stone, and said clamp is integral with said trolley and includes a pair of jaws and means for moving at least one of said jaws in a direction which is transverse to said cutting path wherein said means for moving said at least one jaw comprises a screw member and a ball joint interconnecting said screw member and said at least one jaw.

2. The apparatus of claim 1 wherein said plurality of aligned saws includes a first saw positioned to cut to a first depth which is approximately one-third through said stone, a second saw positioned to cut to a second depth which is approximately two-thirds through said stone, and a third saw positioned to cut to a third depth which is completely through said stone.

3. The apparatus of claim 1 wherein said controller comprises sensing means for sensing the resistance of the stone being cut, comparator means for comparing the sensed resistance to a predetermined resistance value, and speed reduction means for reducing the speed of the stone along said cutting path if the resistance to cutting exceeds said predetermined value.

4. The apparatus of claim 3 further including an electric motor for driving each of said saws, and said sensing means senses amperage of at least one of said electric motors.

5. The apparatus of claim 1 further including a pivot connection located between said ball joint and said at least one jaw, said pivot connection defining an axis of rotation transverse to both said cutting path and the direction of movement of said at least one jaw.

6. Apparatus for cutting a stone to make a stone veneer product, comprising:

a conveyor for conveying a stone to be cut at a desired speed along a cutting path;

a clamp for clamping said stone in a desired position on said conveyor;

a plurality of aligned saws for cutting through said stone to form a pair of stone veneer products, said saws positioned to make a plurality of sequential cuts in said stone with each subsequent cut being deeper than the previous cut as said stone moves downstream along said cutting path;

a controller for controlling the desired speed of the stone as a function of resistance of the stone to being cut;

a trolley on said conveyor for receiving said stone, and said clamp is integral with said trolley and includes a pair of jaws and means for moving at least one of said jaws in a direction which is transverse to said cutting path, and wherein said stone has a textured surface, and each of said jaws include a clamping face adapted to substantially conform to said textured surface when clamped against said stone, wherein said clamping face comprises a rubber lining.

7. Apparatus for cutting a stone to make a stone veneer product, comprising:

a conveyor for conveying a stone to be cut at a desired speed along a cutting path;

a plurality of aligned saws for cutting through said stone to form a pair of stone veneer products, said saws positioned to make a plurality of sequential cuts in said stone with each subsequent cut being deeper than the previous cut as said stone moves downstream along the cutting path;

a clamp for clamping said stone in a desired position on said conveyor, said clamp comprising a pair of jaws, a screw member, and a ball joint interconnecting said screw member and at least one jaw, wherein at least one of said jaws moves in a direction which is transverse to said cutting path;

a trolley on said conveyor for receiving said stone, said clamp being integral with said trolley; and, a pivot connection located between said ball joint and said at least one jaw, said pivot connection defining an axis of rotation transverse to both said cutting path and a direction of movement of said at least one jaw.

8. The apparatus of claim 7 wherein said stone has a textured surface and each of said jaws include a clamping face adapted to substantially conform to said textured surface when clamped against said stone.

9. The apparatus of claim 8 wherein said clamping face comprises a rubber lining.

* * * * *